United States Patent [19]

Brandt

[11] Patent Number: 5,075,135
[45] Date of Patent: Dec. 24, 1991

[54] PROCESS FOR PROVIDING THE SURFACE OF A FILM MADE FROM A WELDABLE POLYMER MATERIAL WITH PROJECTIONS

[75] Inventor: Michael Brandt, Seevetal, Fed. Rep. of Germany

[73] Assignee: Schlegel Lining Technology GmbH, Hamburg, Fed. Rep. of Germany

[21] Appl. No.: 665,932

[22] Filed: Mar. 5, 1991

Related U.S. Application Data

[60] Continuation of Ser. No. 409,050, Sep. 19, 1989, abandoned, which is a division of Ser. No. 258,096, Oct. 14, 1988, which is a continuation of Ser. No. 068,657, Jul. 30, 1987 abandoned.

[30] Foreign Application Priority Data

Jul. 4, 1986 [DE] Fed. Rep. of Germany ....... 3622559

[51] Int. Cl.⁵ .............................................. B05D 1/12
[52] U.S. Cl. ..................................... 427/180; 427/195; 427/197; 427/322; 427/422
[58] Field of Search ............... 427/180, 197, 195, 322, 427/422

[56] References Cited

U.S. PATENT DOCUMENTS

| | | | |
|---|---|---|---|
| 2,793,136 | 5/1957 | Root | 427/180 X |
| 3,973,059 | 8/1976 | Brown et al. | 427/180 |
| 4,278,483 | 7/1981 | Mansolillo | 427/195 X |
| 4,623,589 | 11/1986 | Simmonds | 427/180 X |

*Primary Examiner*—Bernard D. Pianalto
*Attorney, Agent, or Firm*—Cumpston & Shaw

[57] ABSTRACT

A process for providing the surface of a film made from a weldable polymer material with projections. The projections are formed by particles which are applied, in particular sprayed, in the molten state onto the film surface. The welding factor is preferably significantly below 1.

12 Claims, 2 Drawing Sheets

PROCESS FOR PROVIDING THE SURFACE OF A FILM MADE FROM A WELDABLE POLYMER MATERIAL WITH PROJECTIONS

This is a continuation of copending application Ser. No. 07/409,050, filed on Sept. 19, 1989 which is a divisional of 07/258,096 filed on Oct. 14, 1988, which is a continuation of Ser. No. 068,657, filed on Jul. 30, 1987 abandoned.

DESCRIPTION

The invention relates to a process for providing the surface of a film made from a weldable polymer material with projections, and a film furnished by this process.

As used herein, weldable polymer material means one which can be bonded by welding or processes similar to welding to parts made from the same or another material if at least one of the two parts is at elevated temperature. In general, this means a thermoplastic material.

Apart from thin membranes, the term film also covers thicker, sheet-like objects up to a thickness of several millimeters.

Films are frequently employed for separating solid regions, in particular in excavation work, hydraulic engineering and civil engineering. In such applications may be disadvantageous that the film interrupts the frictional contact between these regions. It is known to counteract this disadvantage by providing one or both surfaces of the film with a large number of projections or recesses by emboss molding of the film. This has the disadvantage that the film structure is damaged. In addition, the known process is expensive.

It is an object of this invention to reduce the expense for the production of film roughness and to avoid damage to the film material.

One embodiment of the invention comprises applying to the surface particles of a material which can be welded to the film surface while the film surface and/or the particles are at the welding temperature.

The particles, in the molten state, are advantageously thrown against the film surface. As used herein, this means free flight or fall of the particles with a speed such that the kinetic energy of the particles is sufficient to press them against the film surface on impact and, at the same time, to deform them in order to create adequate surface contact.

The molten composition used for formation of the particles is for example sprayed against the film.

According to a particular feature of the invention, the surface temperature of the film on impact of the particles should be less than about 70° C. This figure applies to polyethylene. In the case of materials having a higher or lower melting point, the limit is correspondingly higher or lower. It is preferably even below 50° C., this causes the thermal loading of the film through welding to be low since it is the particles which provide the necessary heat of melting due to the relatively high inherent temperature. Additionally, it causes welding of the film to the particles to occur to an only incomplete extent, i.e. with a welding factor significantly below 1. As used herein, welding factor means the ratio of the strength of the welded joint to the strength of the material, expressed as a fraction or as a percentage. Whereas, in general in weldings, a welding factor of as close to 1 as possible is desired, i.e. a welding zone strength which is similar to the strength of the base material, a limited, lower weld quality is desirable in accordance with invention so that only a limited force can be exerted on the film during lateral shear stress of the particles welded to the film. If this force threshold is reached, the particle detaches from the film surface without damaging the film.

A film according to the invention is correspondingly distinguished by the fact that the projections arranged on its surface are welded to the film surface with a welding factor which is significantly below 1. This factor is advantageously below 0.9, further expediently below 0.7, further expediently below 0.5 and further expediently about 0.3.

Preferably the projections have an irregular shape and arrangement as arises during chance shaping on leaving a spray nozzle. In particular, they are oblong shaped having a length/thickness ratio which is, on average, above 4. However, the projections can also have a smaller length/thickness ratio, but this should be at least 1. In particular, the projections may be round. The height of the projections that is the distance the projection protrudes over the film surface may be matched to the structure of the solid with which they are to interact. If this solid is a very coarsely grained fill material, the projections may also be made relatively coarse. If, in contrast, the solid is a fine-grained substance, for example shady or loamy soil, small projections suffice. It has proven very expedient for them to have an average height of less than about 2 mm.

In certain applications it is sufficient to provide only one of the two film surfaces with roughness projections. In general, such a provision is preferred on both film surfaces.

The invention is described below in greater detail with reference to the drawing, in which:

DETAILED DESCRIPTION OF THE DRAWING

Figure 1:
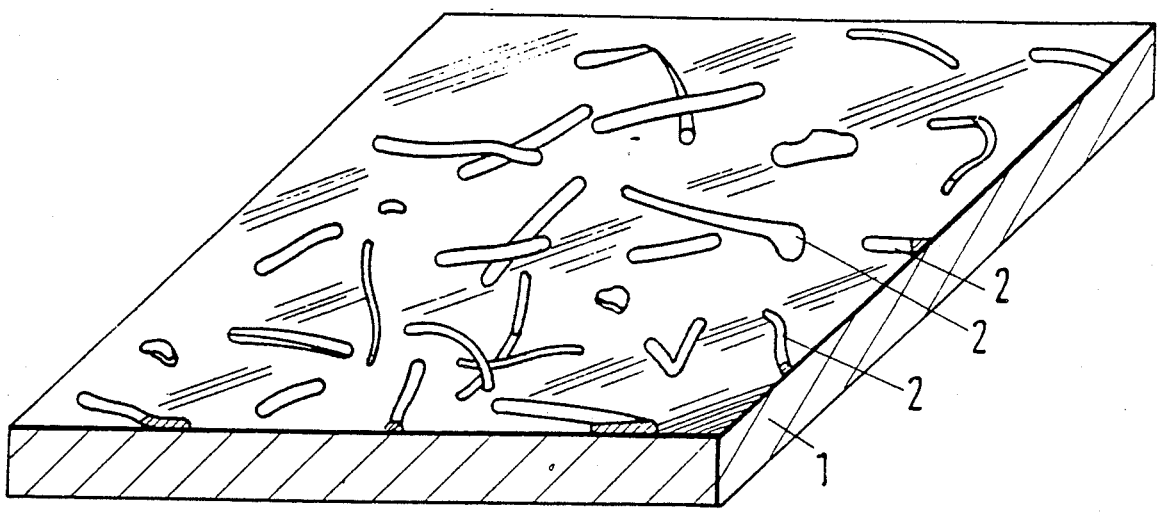
FIG. 1 shows an illustration, enlarged to a scale of about 5:1, of a film section.

FIG. 1 shows a detail from a film (1) as is known in the prior art for earth-sealing sheeting, for example for dump-sealing sheeting or dike-sealing sheeting. It can comprise, for example, polyethylene or comparable materials. Its thickness is, for example, of the order of 2 mm, although the invention can also be used in films of significantly less or greater thickness.

On its upper side can be seen the particles (2) which are welded to its surface and which, it is assumed in the case shown, have been applied by a spraying process and have received an oblong, irregular shape during spraying. They are preferably elongated, and lie on the film surface in their longitudinal direction, and their height above the surface, which is equal to their thickness, is preferably between 0.1 and 1 times the film thickness. However, they may, in the context of the invention, have another shape, for example a shape with a length/thickness ratio nearer 1.

Figure 2:
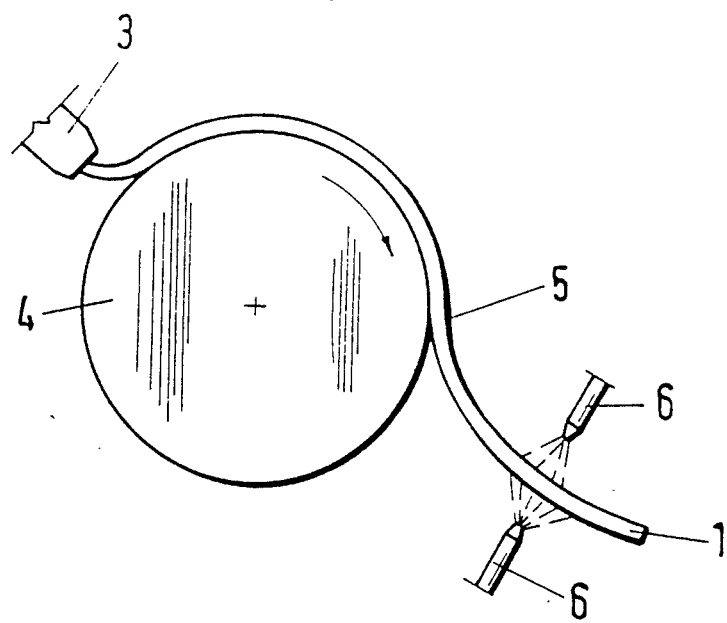
FIG. 2 shows a device for carrying out the process.

FIG. 2 shows the production process in a schematic side view of a production apparatus. The film is produced by extruding the film material from the extruder nozzle (3) onto the surface of the cooling drum (4). After adequate cooling and solidification, the film is removed from the drum at (5) and fed to a winding or further processing device, not shown. At a small distance from the drum (4) are located upper and lower spray nozzles (6), from which the material forming the projections (2) is sprayed onto the film surface. The nozzles may be designed according to the relevant prior art with respect to their shape, the material pressure to be used taking into account the viscosity of the material and with respect to the possible use of additional compressed gas so that the particles emerging from the spray nozzle have the desired shape and speed. The position of the nozzles (6) is selected so that the surface of the film (1) at the spraying point has the temperature suitable for achieving the desired welding factor. For regulation, the nozzles can either be designed to be movable, so that, if desired, they can be employed closer to the drum (relatively high temperature) or further from it (relatively low temperature). Additional warming or cooling means for the film surface may also be provided.

Figure 3:
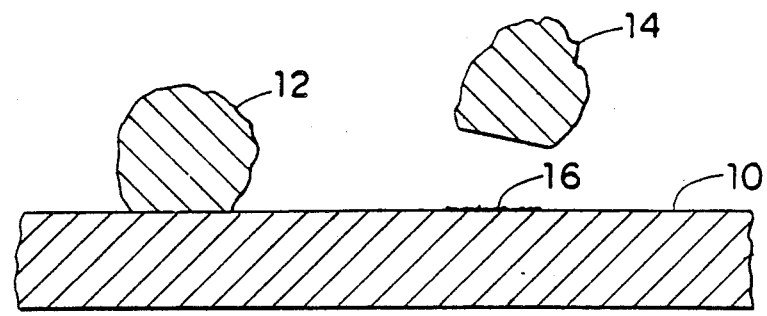
FIG. 3 shows a section view of a film in accordance with this invention.

FIG. 3 shows a section view of a film 10 having projections 12 and 14 thereon in accordance with the teaching of this invention. Particle 12 is adhered to the surface of film 10 by a weld having a weld factor less than 1. Particle 14 is shown detached from the surface of film 10 for example by locally high stress. Film 10 is not damaged by the detachment of projection 14 which at most leaves a slightly roughened surface area 16 where the base of projection 14 was previously attached.

I claim:

1. A process for providing the surface of a film made form a weldable polymer material with projections, for forming an increased friction damage resistant film, comprising the steps of welding particles to the surface by applying particles of a material which can be welded to the film material to the surface while maintaining the surface and/or the particles at a welding temperature to form a weld characterized by a weld factor significantly less than 1, and comprising no further steps that would increase the weld factor to more than 1.

2. A process for providing the surface of a film made from a weldable polymer material with projections, for forming an increased friction damage resistant film comprising the steps of:
welding particles to the surface by throwing particles of a material that can be welded to the film material in a molten state against the film surface while maintaining the surface and/or the particles at a welding temperature to form a weld characterized by a weld factor significantly less than 1.

3. The process as claimed in claim 2, wherein the particles are sprayed against the film from a molten composition.

4. The process as claimed in claim 3, wherein the surface temperature of the film on impact of the particles is less than 70° C.

5. The process as claimed in claim 4, wherein the surface temperature of the film on impact of the particles is less than 50° C.

6. The process as claimed in claim 2, wherein the surface temperature of the film on impact of the particles is less than about 70° C.

7. The process as claimed in claim 6, wherein the surface temperature of the film on impact of the particles is less than 50°.

8. The process as claimed in claim 1, wherein the surface temperature of the film on impact of the particles is less than 70° C.

9. The process as claimed in claim 8, wherein the surface temperature of the film on impact of the particles is less than 50° C.

10. The process as claimed in claim 1, wherein the particles are sprayed against the film from a molten composition.

11. The process as claimed in claim 10, wherein the surface temperature of the film on impact of the particles is less than about 70° C.

12. The process as claimed in claim 11, wherein the surface temperature of the film on impact of the particles is less than 50 C.

* * * * *